United States Patent [19]

Leighty

[11] 4,218,105
[45] Aug. 19, 1980

[54] SOUND SUPPRESSED BATTERY BOX

[75] Inventor: Conard E. Leighty, Metamora, Ill.

[73] Assignee: Caterpillar Tractor Co., Peoria, Ill.

[21] Appl. No.: 936,989

[22] Filed: Aug. 25, 1978

[51] Int. Cl.² .................. B62D 25/00; A47B 81/00
[52] U.S. Cl. ...................... 312/291; 312/292; 312/293; 180/68.5
[58] Field of Search ............. 312/291, 292, 293, 242; 180/68.5

[56] References Cited

U.S. PATENT DOCUMENTS

| 363,372 | 5/1887 | Dollens | 312/291 |
|---|---|---|---|
| 2,094,329 | 9/1937 | Mascuch | 180/68.5 |
| 2,159,890 | 5/1939 | Ferguson | 180/68.5 |
| 2,169,605 | 8/1939 | Griese | 312/293 |
| 3,003,573 | 10/1961 | Lorenz | 180/68.5 |
| 3,275,092 | 9/1966 | Matthews | 180/68.5 |
| 3,334,953 | 8/1967 | Becker | 312/293 |
| 3,667,648 | 6/1972 | Koziol | 312/292 |
| 3,993,378 | 11/1976 | Berkus | 312/293 |
| 4,108,266 | 8/1978 | Wojtyna | 180/68.5 |

FOREIGN PATENT DOCUMENTS 600118  11/1929  Fed. Rep. of Germany .......... 180/68.5

Primary Examiner—Victor N. Sakran
Attorney, Agent, or Firm—Phillips, Moore, Weissenberger, Lempio & Majestic

[57] ABSTRACT

A box for storing a battery or the like comprises a plurality of upstanding panels (11–14) defining a storage compartment (16) and a removable cover (18) disposed over the compartment. A door (24) is movably mounted adjacent to the compartment and when closed firmly by a latch (26) holds the cover in place to attenuate noise emanating in the storage box. A sound suppressor (37) extends inwardly from the door to overlie the cover to engage and hold the cover against a support (20-23) and to attenuate noise.

8 Claims, 4 Drawing Figures

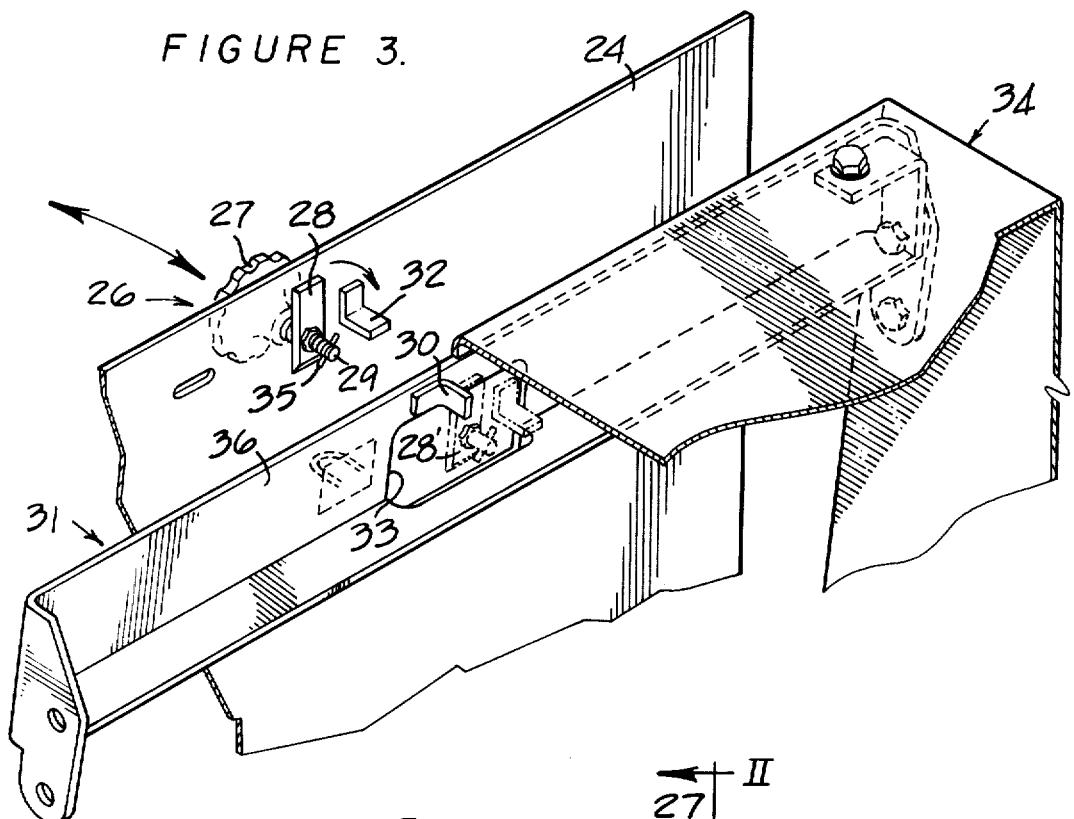
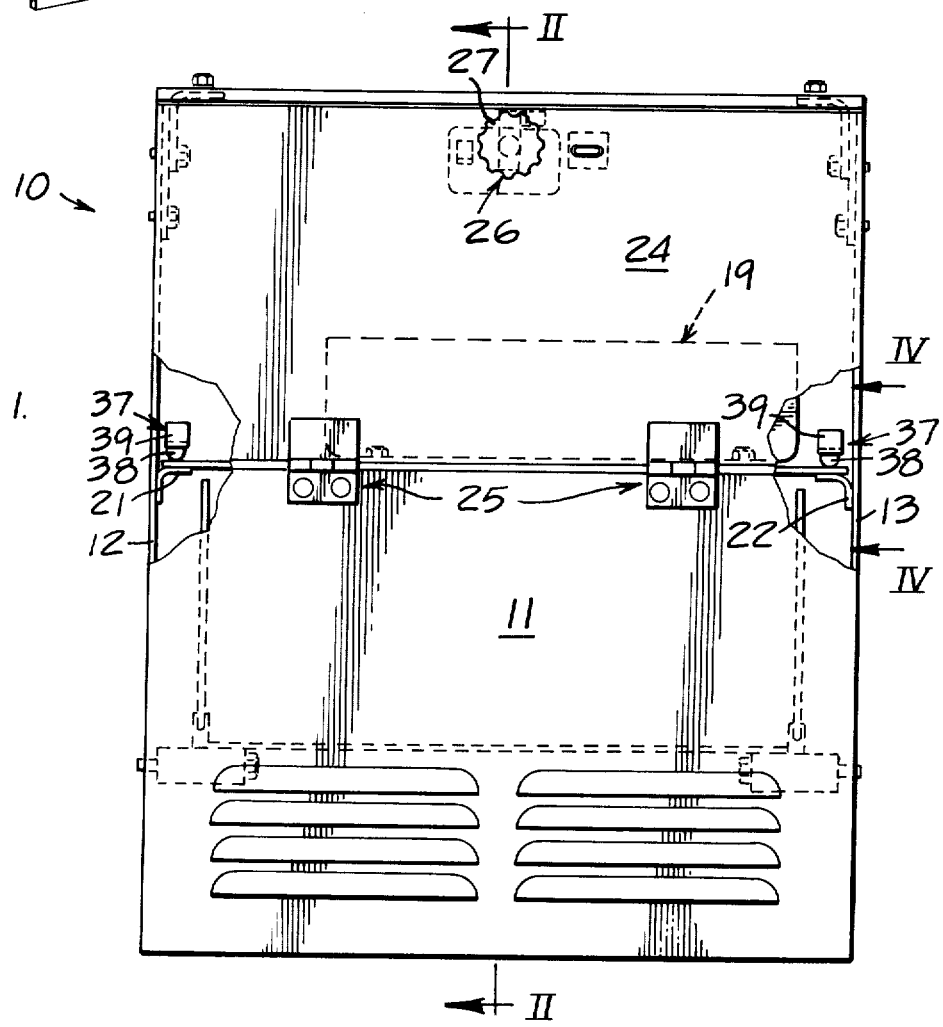

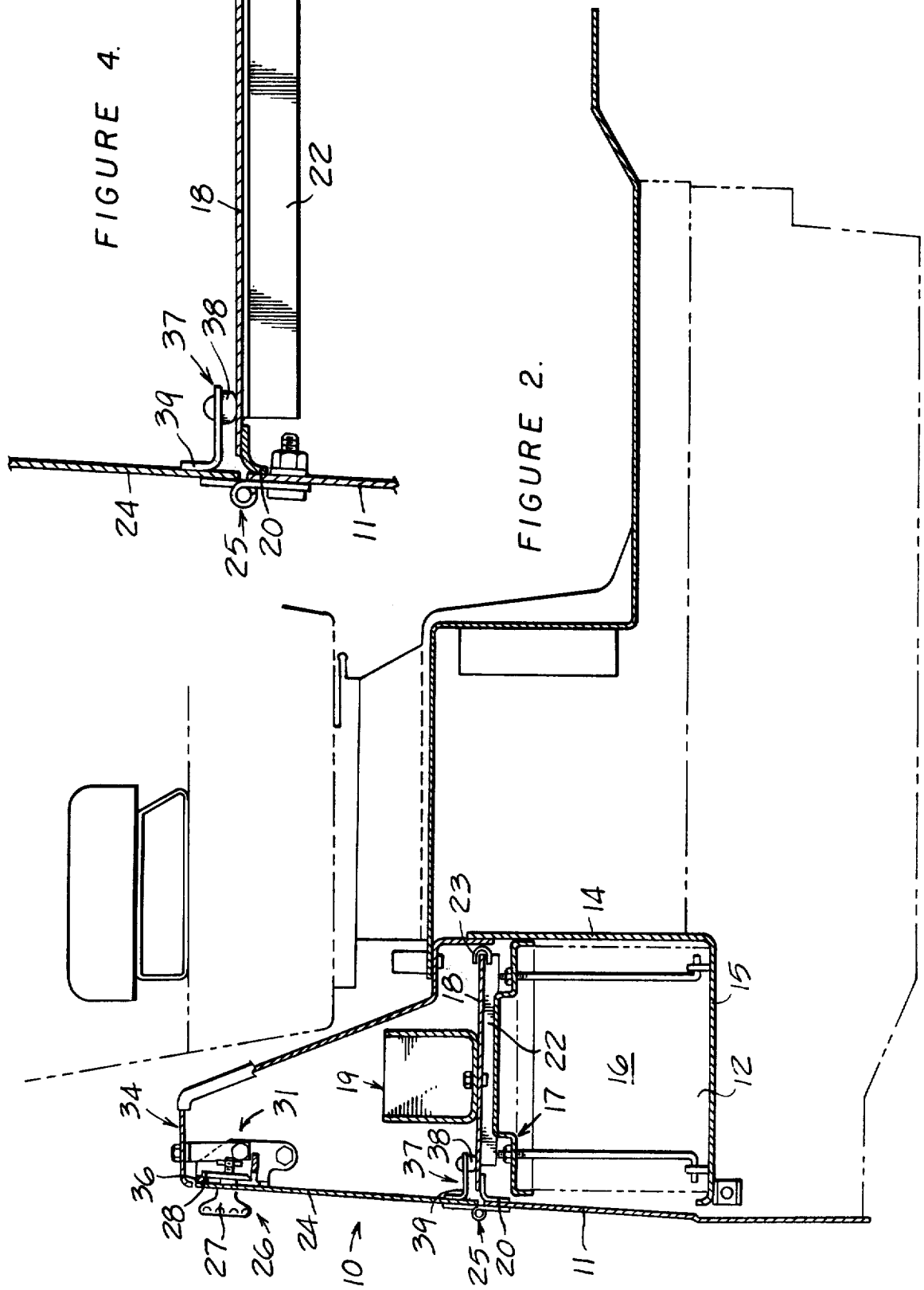

SOUND SUPPRESSED BATTERY BOX

TECHNICAL FIELD

This invention relates to a sound suppressed storage box of the type adapted to retain a battery or the like therein.

BACKGROUND ART

The battery employed on a construction vehicle is mounted in a storage box and is normally covered by a loose fitting plate or the like. Such a loose fit gives rise to rattling and associated noise upon operation of the vehicle. The utilization of bolts or the like to secure the cover in place to prevent rattling thereof gives rise to the further problem of expeditiously servicing the battery when the need arises.

DISCLOSURE OF THE INVENTION

The present invention is directed to overcoming one or more of the problems as set forth above.

In one aspect of this invention, a sound suppressed storage box comprises a plurality of panels defining a storage compartment therein. A horizontally disposed cover is disposed and supported over the compartment and a vertically disposed door is pivotally mounted adjacent to the compartment for movement between open and closed positions. A latch means selectively locks the door in its closed position on the storage box. Sound suppression means, disposed between the cover and the door when the door is maintained in its closed position and extending inwardly from the door to overlie the cover, functions to engage and hold the cover against the support means and further functions to attenuate potential noise caused thereby.

The sound suppressed storage box of this invention thus provides a facile and noise-suppressed system which is adapted to be opened expeditiously for servicing of an item retained in the storage compartment.

BRIEF DESCRIPTION OF THE DRAWINGS

Other objects of this invention will become apparent from the following description and accompanying drawings wherein:

FIG. 1 is a front elevational view of a sound suppressed storage box, embodying the present invention;

FIG. 2 is a sectional view through the storage box and attendant panels, taken in a direction of arrows II—II in FIG. 1;

FIG. 3 is an enlarged isometric view of a portion of the storage box, illustrating a latch mechanism for selectively opening and closing a door thereof; and FIG. 4 is an enlarged sectional view, illustrating a sound suppression means employed in the storage box, with the view being taken in a direction of arrows IV—IV in FIG. 1.

BEST MODE FOR CARRYING OUT THE INVENTION

FIGS. 1 and 2 illustrate a storage box 10 comprising four upstanding side panels 11, 12, 13 and 14 and a bottom panel 15, all defining a compartment 16 in the storage box. A battery or the like is adapted to be releasably secured within the storage compartment by means of a standard hold-down assembly 17. A cover 18, preferably in the form of a flat plate, is disposed over the storage compartment and may have a tool box 19 secured thereon, if so desired. The tool box is thus positioned for ready access and the weight thereof aids in holding the cover down.

Cover 18 is supported over storage compartment 16 by support means preferably comprising angles 20, 21 and 22, having vertically disposed legs thereof suitably secured to panels 11, 12 an 13, respectively. A channel 23 (FIGS. 2 and 4) is secured between side panels 12 and 13 to receive the rearward edge of cover 18 in a slot defined therein. The remaining periphery of the cover is disposed on the horizontally disposed legs of angles 20, 21 and 22.

A door 24, preferably in the form of a flat plate, is pivotally mounted on an upper end of panel 11 by a pair of spaced hinges 25 for movement between its illustrated closed position (FIGS. 1 and 2) and an open position (FIG. 3) on the storage box. A standard latch mechanism 26 is adapted to lock the door in its closed position. The latch mechanism may comprise a knob 27 rotatably mounted on the door and a locking plate 28 threadably mounted on a shaft 29 secured to the knob whereby rotation of the knob in either direction will pivot as well as move the locking plate axially on the threaded shaft.

A first stop lug 30 is secured to a bracket assembly 31 to limit pivotal movement of the locking plate in one direction whereas a second stop lug 32, secured to door 24, limits such pivotal movement in a second, opposite direction. An opening 33 (FIG. 3) is suitably formed through bracket assembly 31, which is secured to a panel assembly 34 of the storage box, to facilitate the insertion of locking plate 28 therethrough, when the locking plate engages stop lug 32.

From the above description, it can be seen in FIG. 3 that when it is desired to close and lock door 24 to bracket assembly 31 that knob 27 is initially rotated to engage locking plate 28 with stop lug 32. The door is then closed against the bracket assembly whereby the locking plate and shaft 29, having a roll pin 35 secured on an end thereof, are inserted through opening 33. The knob is then rotated to engage the locking plate, at its 28' position, against stop lug 30. Further rotation of the knob will frictionally engage roll pin 35 with the locking plate to compress it against the back side of a plate portion 36 of bracket assembly 31 whereby the cover is firmly locked in place.

Referring to FIGS. 1, 2 and 4, a novel aspect of this invention comprises sound suppression means 37 disposed between cover 18 and door 24 when the door is maintained in its closed position for engaging and holding the cover against the support means comprising angles 20–22 and channel 23 and for attenuating noise. The sound suppression means may comprise a pair of elastomeric pads 38 secured to a pair of longitudinally spaced angles or brackets 39. The angles are secured to door 24 and support the pads thereon in spaced relationship and inwardly from the door and an edge of cover 18. The pads are thus disposed a sufficient distance from the door and over cover 18 to apply a compressive force thereto to prevent rattling of the cover. The pads may be composed of rubber or other suitable elastomer which will exhibit the desired resiliency and compressive characteristics to firmly hold the cover in place upon closing of the door.

INDUSTRIAL APPLICABILITY

Upon servicing of a construction vehicle, for example, it is necessary to periodically service the battery or other component parts of the vehicle retained in storage compartment 16. Servicing can be expeditiously accomplished by merely rotating knob 27 to release latch mechanism 26 in the above-described manner whereby door 24 may be pivoted counterclockwise in FIG. 2 to its open position to release sound suppression means 37 from cover 18. The cover may then be removed, along with tool box 19, to expose the battery for servicing purposes. Although the sound suppression means and attendant structures of this invention find particular application to a battery box, it should be understood that other industrial applications will be obvious to those skilled in the art, e.g., this invention is applicable to any system wherein it is desired to firmly hold a cover in place over a storage compartment.

Other aspects, objects, and advantages of this invention can be obtained from a study of the drawings, the disclosure and the appended claims.

What is claimed is:

1. A sound suppressed storage box (10) comprising
    a plurality of panels (11-15) defining a storage compartment therein,
    a horizontally disposed cover (18) disposed over said compartment,
    support means (20-23) secured to at least one of said panels for supporting said cover over said compartment,
    a vertically disposed door (24) having a first end thereof pivotally mounted on one of said panels adjacent to said compartment for movement between open and closed positions,
    latch means (26), mounted adjacent to a second end of said door (24) opposite to the first end thereof, for selectively locking said door (24) in its closed position on said storage box (10), and
    sound suppression means (37) disposed between said cover (18) and said door (24) when said door (24) is maintained in its closed position by said latch means and extending inwardly from said door (24) in overlying relationship relative to said cover (18) for engaging and holding said cover (18) against said support means (20-23) and for attenuating noise.

2. The storage box of claim 1 wherein said panels comprise a plurality of upstanding side panels (11-14) and a horizontally disposed bottom panel (15) secured to at least one of said side panels.

3. The storage box of claim 2 further comprising a battery hold-down assembly (17) mounted in said compartment.

4. The storage box of claim 2 wherein said support means comprises an angle (20-22) secured to at least some of said side panels.

5. The storage box of claim 4 wherein said support means further comprises a channel (23) secured to at least one of said side panels and wherein said cover has an edge thereof disposed in said channel.

6. The storage box of claim 1 wherein said sound suppressing means is secured interiorly on said door for movement therewith from a first position releasing said cover upon opening of said door and a second position for engaging and holding said cover against said support means upon closing of said door.

7. The storage box of claim 6 wherein said sound suppression means comprises at least one elastomeric pad (38).

8. The storage box of claim 7 wherein said elastomeric pad is secured to a bracket (39) which is secured interiorly on said door and wherein said pad is disposed substantially inwardly from said door and an edge of said cover.

* * * * *